United States Patent
Tilly et al.

(10) Patent No.: US 9,198,352 B2
(45) Date of Patent: Dec. 1, 2015

(54) FRONT ATTACHMENT ABLE TO BE RETROFITTED WITH A SECOND DRIVE TRAIN AND TO OPERATE INDEPENDENTLY OF ROWS FOR HARVESTING STALK CROP

(71) Applicant: CLAAS HUNGARIA KFT., Toeroekszentmiklos (HU)

(72) Inventors: Thomas Tilly, Warendorf (DE); Thomas Dennis Engler, Germaringen (DE); Bernhard Aerdker, Warendorf (DE); Tim Luetke Harmann, Sensenhorst (DE)

(73) Assignee: CLAAS HUNGARIA KFT., Toeroekszentmiklos (HU)

( * ) Notice: Subject to any disclaimer, the term of this patent is extended or adjusted under 35 U.S.C. 154(b) by 223 days.

(21) Appl. No.: 13/944,163

(22) Filed: Jul. 17, 2013

(65) Prior Publication Data
US 2014/0020355 A1  Jan. 23, 2014

(30) Foreign Application Priority Data
Jul. 20, 2012  (DE) .......................... 10 2012 106 603

(51) Int. Cl.
*A01D 45/02* (2006.01)

(52) U.S. Cl.
CPC .................................. *A01D 45/021* (2013.01)

(58) Field of Classification Search
CPC ... A01D 45/021; A01D 43/082; A01D 45/02; A01D 45/025; A01D 41/142; A01D 69/00; A01F 29/14
USPC ....................................... 701/50; 56/10.8, 103
See application file for complete search history.

(56) References Cited

U.S. PATENT DOCUMENTS

| | | | | |
|---|---|---|---|---|
| 2,661,585 | A * | 12/1953 | Hansen | 56/13.3 |
| 3,423,910 | A * | 1/1969 | Shimamoto et al. | 56/13.3 |
| 3,520,121 | A * | 7/1970 | Ashton et al. | 56/106 |
| 3,759,021 | A * | 9/1973 | Schreiner et al. | 56/106 |
| 3,988,877 | A * | 11/1976 | Martin et al. | 56/11.6 |
| 4,269,017 | A * | 5/1981 | deBuhr et al. | 56/106 |
| 4,433,531 | A * | 2/1984 | Kesl et al. | 56/106 |
| 4,524,571 | A * | 6/1985 | Mak et al. | 56/98 |
| 4,738,651 | A * | 4/1988 | Favache et al. | 474/19 |
| 4,846,198 | A * | 7/1989 | Carnewal et al. | 460/21 |
| 6,272,822 | B1 * | 8/2001 | Schrattenecker | 56/123 |
| 6,370,853 | B1 * | 4/2002 | Randall et al. | 56/14.2 |
| 8,578,689 | B2 * | 11/2013 | Luetke-Harmann et al. | 56/119 |
| 2003/0172638 | A1 * | 9/2003 | Ameye et al. | 56/16.4 R |

(Continued)

FOREIGN PATENT DOCUMENTS

DE   10 2005 021 792   11/2006

*Primary Examiner* — Arpád Fábián-Kovács
(74) *Attorney, Agent, or Firm* — Michael J. Striker

(57) ABSTRACT

A front attachment for an agricultural harvesting machine operates independently of rows of stalk crop to be harvested. The front attachment includes harvesting devices for harvesting the stalk crop, intake conveyor mechanisms extending across a width of the harvesting devices, snapping devices located downstream of the intake conveyor mechanisms in the direction of the crop flow and a cross conveyor located downstream of the intake conveyor mechanisms and snapping devices. In the arrangement, the cross conveyor and snapping device driven by a common drive train, the front attachment is prefabricated to enable retrofitting with a second drive train and the second drive train functions as the drive for a retrofittable chopping device.

15 Claims, 4 Drawing Sheets

(56) References Cited

U.S. PATENT DOCUMENTS

| | | |
|---|---|---|
| 2004/0060271 A1* | 4/2004 | Ameye .......................... 56/10.8 |
| 2006/0042217 A1* | 3/2006 | Buermann ...................... 56/257 |
| 2007/0191179 A1* | 8/2007 | Hugenroth et al. ............... 477/2 |
| 2007/0197327 A1* | 8/2007 | Arnold et al. ................. 474/152 |
| 2007/0289281 A1* | 12/2007 | Altepost et al. ................... 56/64 |
| 2009/0192734 A1* | 7/2009 | Mackin .......................... 702/56 |
| 2010/0018176 A1* | 1/2010 | Mortier et al. ................. 56/13.6 |
| 2010/0300057 A1* | 12/2010 | Luetke-Harmann et al. ... 56/119 |
| 2012/0055131 A1* | 3/2012 | Zegota et al. ..................... 56/60 |

\* cited by examiner

FRONT ATTACHMENT ABLE TO BE RETROFITTED WITH A SECOND DRIVE TRAIN AND TO OPERATE INDEPENDENTLY OF ROWS FOR HARVESTING STALK CROP

CROSS-REFERENCE TO A RELATED APPLICATION

The invention described and claimed hereinbelow is also described in German Patent Application DE 10 2012 10603.5, filed on Jul. 20, 2012. This German Patent Application, subject matter of which is incorporated herein by reference, provides the basis for a claim of priority of invention under 35 U.S.C. 119(a)-(d).

BACKGROUND OF THE INVENTION

The invention relates to a front attachment for an agricultural harvesting machine that operates independently of rows for harvesting stalk crop.

Front attachments for agricultural harvesting machines are known. Document DE 102005021792A1, for example, describes a front attachment for use with a self-propelled harvesting machine such as a combine harvester or a forage harvester. The front attachment so discloses comprises intake conveyor and snapping units, which are disposed in pairs and are used to pick up and convey as well as harvest the stalk crop. A cross auger is disposed downstream of the intake conveyor and snapping units and feeds the crop to a feed rake, which feeds crop into the harvesting machine. A chopping device (designed as a cutting disc), is located underneath each of the intake conveyor and snapping units and separates the plant stalks from the stump, which remains in the ground.

These components, i.e., the intake conveyor and snapping units, the cross auger and the cutting discs are driven by means of a common drive train. To this end, drive power provided by an internal combustion engine of the harvesting machine is transferred by a chain or a belt to a universal drive shaft of the front attachment. The universal drive shaft leads into a transmission housing (which houses a transmission), from which transmission the drive power is distributed to the components to be driven. The intake conveyor and snapping units are disposed in pairs and are connected to one another on the drive side by a continuous shaft extending across the width of the front attachment. Bevel gears branch off from the shaft to the respective intake conveyor and snapping units and to the particular cutting discs.

SUMMARY OF THE INVENTION

The present invention overcomes the shortcomings of known arts, such as those mentioned above.

In an embodiment, the present invention is a front attachment, which operates independently of rows, is characterized by simplified and cost-favorable design.

In more detail, the inventive front attachment is prefabricated in such a manner that it can be retrofitted with a second drive train, which functions as a drive for a chopping device that can be retrofitted on the front attachment. The modularity is achieved by providing a second drive train and a chopping device, which can be retrofitted if necessary, resulting in a simpler and more cost-favorable design of the front attachment.

This inventive front attachment so designed results in a high degree of flexibility in the use of the front attachment since, due to the modularity, the drive train comprising the chopping device is detachable in the same manner. The first drive train in particular (which is the common drive for the harvesting devices, i.e. the intake conveyor mechanisms, the snapping devices, and the cross conveyor) is dimensioned more cost favorably since the power requirement of the chopping device is disregarded in the design of the first drive train. The front attachment also displays a lower overall weight due to the elimination of the chopping device, which is not required in all harvesting conditions.

A further advantage of the modularity of the inventive front attachment is that the basic output of the common drive train is lower for the intake conveyor mechanism, the snapping device, the cross conveyor and the second retrofittable drive train for the retrofittable chopping device than that of a single drive train for all components.

Advantageously, the second drive train and the chopping device driven thereby can be designed as separate modules. The assembly and disassembly of the second drive train and the chopping device are thereby simplified.

In particular, the first drive train and the second drive train comprise means for varying the speed that can be output to the driven assemblies. This feature enables separating the settability and adjustability of the drive speeds of the harvesting device and of the retrofittable chopping device, thereby improving the adaptability to changing harvesting conditions.

The means for varying the speed that can be output to the driven assemblies permit a stepless or stepped adjustment of the speed. A variator transmission is preferably provided as the means for the stepless variation of the speed of the assemblies that can be driven separately by the first and second drive trains. As an alternative, a hydromechanical or electric drive solution that permits a stepless adjustment of the speed may be provided. For that matter, a manually adjustable belt drive may be provided to implement a stepped variation of the speed. The design of the drive trains having a means for the stepped or stepless adjustment of the speed permits flexible adaptation even to greatly varying harvesting conditions.

Preferably, the chopping device is configured to be shifted independently of the harvesting conditions. By separating the drive trains from intake conveyor mechanisms, snapping devices and cross conveyor and from the chopping device, it is possible to shift the harvesting devices and the chopping device in succession. This feature is advantageous in particular upon engagement of the front attachment. For example, the chopping device can be engaged first, before the remaining harvesting devices of the front attachment are engaged using the first drive train, or vice versa. The load on the drive assembly (typically an internal combustion engine of the harvesting machine that accommodates and drives the front attachment according to the invention), is thereby reduced.

The second drive train is shifted by disengaging and engaging a universal drive shaft in a tool-free manner.

Alternatively, the second drive train is shifted using a central clutch. As a result, the amount of time required is markedly reduced compared to the prior art, which prior art requires that each unit of the intake conveyor mechanism and of the snapping device be coupled manually in order to engage and disengage the chopping device. In addition, the handling of this solution is substantially more convenient. A further advantage of the use of a clutch is that the modular design of the drive trains makes it possible to utilize an additional start-up clutch for limiting the maximum torque upon engagement or disengagement. To this end, a friction coupling can be installed in the second drive train, for example, which absorbs the frictional energy dissipated during shifting.

The shifting procedure, moreover, may be carried out automatically in the invention. The clutch can be shifted from the driver's cab, thereby permitting the operator of the harvesting machine to remain therein. To this end, the operator actuates a switch, for example, which controls an actuator system for operating the clutch. The procedure for engaging the front attachment is optimized in that the second drive train for the chopping device is engaged first, before the intake conveyor mechanisms, the snapping devices and the at least one cross conveyor are operated in a second step. The inertial forces that load the drive are reduced as a result.

Furthermore, a central free wheel mechanism is provided in the second drive train. The central free wheel mechanism helps to lower costs and reduce installation space and weight of the front attachment.

Preferably, the chopping device comprises a transmission housing, which extends substantially across the width of the front attachment, and into which vertically extending knife shafts extend in sections. Also, bevel gears driving the knife shafts are disposed in the transmission housing. The transmission housing comprises all essential components of the chopping device, which can be combined in this manner to form one retrofittable assembly.

In particular, a main transmission (which is a component of the second drive train), is disposed at the transmission housing. The main transmission, which can be coupled to a main drive shaft of the chopping device, in combination with further drive components, forms a further retrofittable assembly. This greatly simplifies the procedure for retrofitting the front attachment, i.e. for installing and deinstalling the chopping device and the second drive train.

The transmission housing is designed as a frame member comprising at least one upper shell and one lower shell, which has flange connections.

Advantageously, the upper shell is a component of a frame structure of the front attachment.

Alternatively, the upper shell is subsequently attachable to the frame structure of the front attachment.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
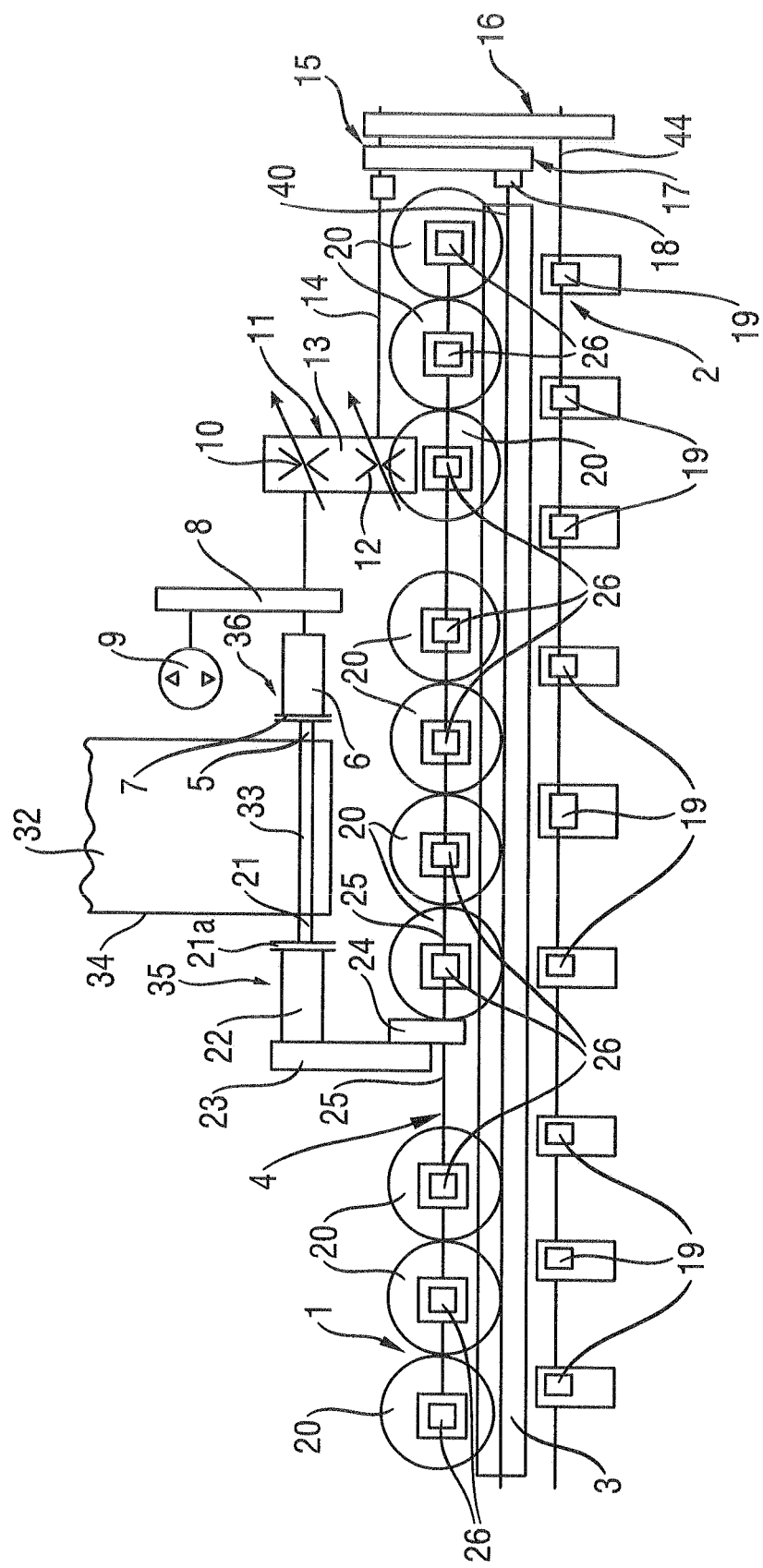
FIG. 1 depicts a schematic representation of a modular front attachment constructed according to the inventive principles.

FIG. 1 shows a front attachment 1, which comprises, inter alia, a snapping device 2, at least one cross conveyor 3, and a chopping device 4. The snapping device 2 and the at least one cross conveyor 3 are components of a harvesting device of the front attachment 1, which, in addition to the chopping device 4, are driven by a combine harvester, which is not shown in greater detail. The snapping device 2 and the at least one cross conveyor 3 are driven by a first driven mechanism 5 of the combine harvester using a first universal drive shaft 6. This first universal drive shaft 6 is selectively coupled to the first driven mechanism 5 using a form-locking clutch 7. For example, when the front attachment 1 is installed on the combine harvester, the universal drive shaft 6 is connected in a driving manner to the first driven mechanism 5 via the form-locking clutch 7. The first driven mechanism 5, the first universal drive shaft 6 and the clutch 7 form a first output train 35, via which both the snapping device 2 and the cross conveyor 3 are driven.

The first universal drive shaft 6 drives a hydraulic pump 9 via a belt drive 8, wherein this hydraulic pump supplies pressure medium within the front attachment 1. To this end, non-illustrated hydraulic circuits are provided, via which control functions are performed at the front attachment 1 using appropriate hydraulic valves.

The universal drive shaft 6 is connected to a primary disc 10 of a variator transmission 11, the variator transmission having a secondary disc 12 and a drive belt 13. An output shaft 14 of the variator transmission 11, which extends from the secondary disc 12, extends to a first traction mechanism drive 15 comprising a belt drive 16, which drives the snapping device 2, and a chain drive 17, which drives the cross conveyor 3. An overload clutch 18 is disposed in the drive of the at least one cross conveyor 3, wherein the overload clutch automatically interrupts the drive of the cross conveyor 3 when a torque value is exceeded. Further overload clutches 19 are assigned to individual snapping rollers of the snapping device 2.

A second drive mechanism 21, at which a second universal drive shaft 22 engages, is provided opposite the above-described first drive mechanism 5. This second universal drive shaft 22 is selectively coupled via a form-locking clutch 21a to the first driven mechanism 21. The second universal drive shaft 22 drives the chopping device 4 via a belt drive 23 and a main transmission 24. The second driven mechanism 21, the clutch 21a, the second universal drive shaft 22, the belt drive 23 and the main transmission 24 form a second output train 36. The second output train 36 is used exclusively to drive the chopping device 4.

As shown in FIG. 1, main drive shafts 25 extend from the main transmission 24, wherein these main drive shafts drive knives 20 of the chopping device 4 via vertically extending knife shafts 59. Overload clutches 26 are located at the drives of the knife shafts 59, which are in the form of bevel gears. Activation of the overload clutches 18, 19 or 26 is detected via a sensor system, thereby signaling a failure of individual snapping rollers, individual knife drives of the chopping device 4, or the at least one cross conveyor 3 to the driver in the cab of the combine harvester. The main transmission 24 may comprise a steplessly variable transmission and alternatively, as a multistage transmission.

The front attachment 1 is coupled to a feed rake 29 of the combine harvester. The feed rake 29 comprises a feed rake shaft 30, which is driven via a main belt drive and drives conveyor chains in the interior of a feed rake housing 31. The feed rake shaft 30 protrudes from the feed rake housing 31 on both sides and forms the driven mechanisms 5 and 21.

Figure 2:
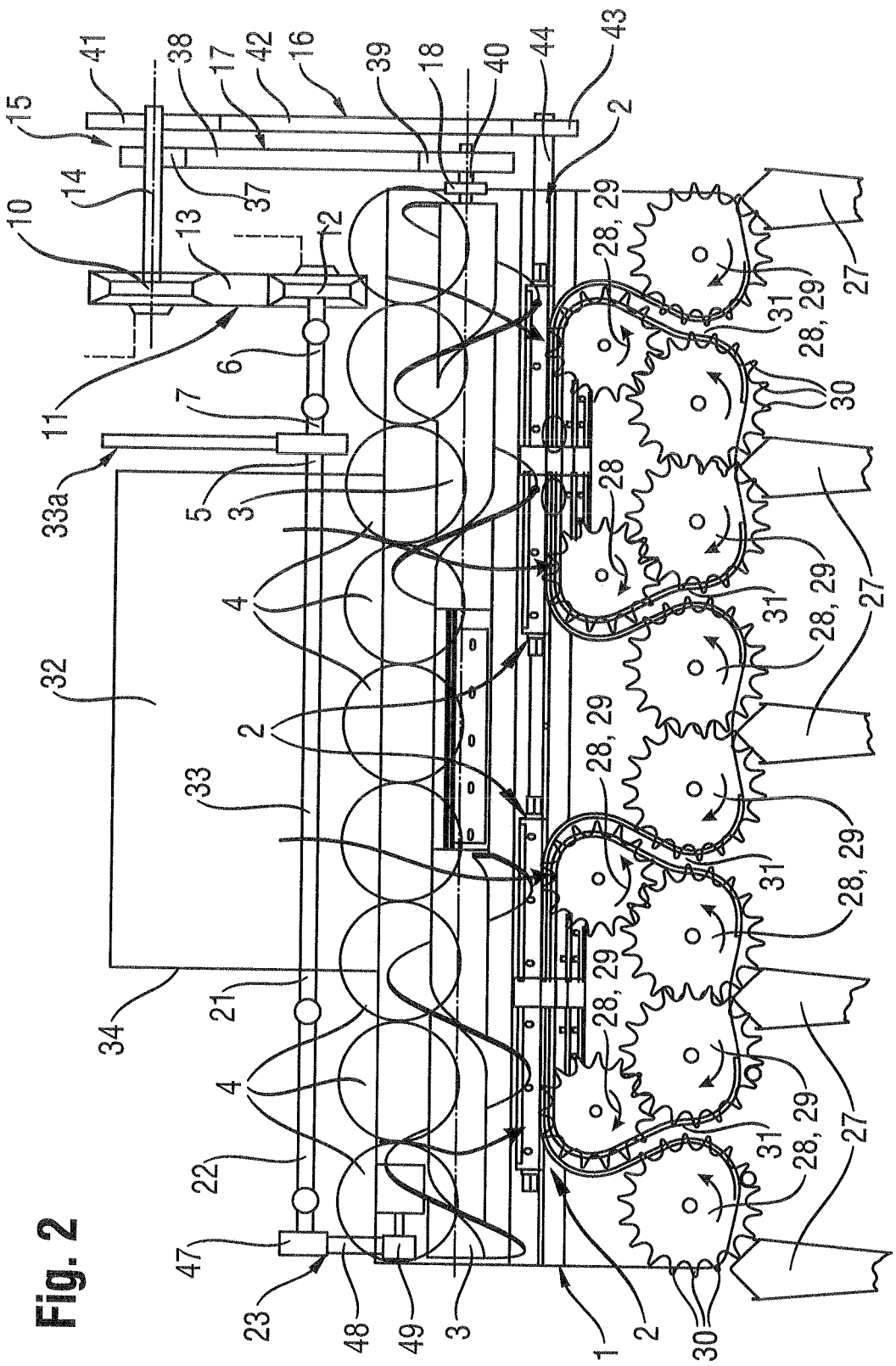
FIG. 2 presents a top view of a thusly designed front attachment in a position installed on a feed rake of a combine harvester.

FIG. 2 also depicts the front attachment 1 with crop dividers 27, downstream of which intake conveyor mechanisms 28 are disposed. The intake conveyor mechanisms grasp and guide the corn stalks. The intake conveyor mechanisms comprise conveyor discs 29 equipped on the circumference thereof with conveyor tines 31 and, are driven in pairs in opposing directions of rotation. The conveyor tines 30 move the corn stalks grasped by these conveyor tines through a conveyor channel 31, at the end of which the corn stalks are received by snapping devices 2 extending transversely to the direction of travel of the combine harvester. FIG. 2 shows the arrangement of the chopping device 4.

FIG. 2 also shows the front attachment 1 coupled to a feed rake 32 of a combine harvester. The feed rake 32 comprises a feed rake shaft 33, which is driven via a main belt drive 33a and drives conveyor chains in the interior of a feed rake housing 34. The feed rake shaft 33 protrudes from the feed rake housing 34 on both sides and forms the driven mechanisms 5 and 21. The first universal drive shaft 6, which extends to the primary disc 10 of the variator transmission 11, is fastened at the driven mechanism 5 via the form-locking clutch 7. Proceeding from this primary disc 10, the drive torque is transferred via the drive belt 13 to the secondary disc 12. The secondary disc is connected via the output shaft 14 to a drive pinion 37 of the chain drive 17, which extends to the cross conveyor 3. A chain 38 of this chain drive 17 drives a shaft 40 of the cross conveyor 3 via a driven pinion 39. The belt drive 16 extends parallel to this chain drive 17. The belt drive comprises a drive pulley 41, which is connected in a rotationally fixed manner to the output shaft 14, a drive belt 42 and a driven pulley 43. The driven pulley is connected to a drive shaft 44 of the snapping device 2.

A second end of the feed rake shaft 33 protrudes beyond the feed rake housing 34 and is connected to a drive of the chopping device 4 (as described with reference to FIG. 1). To this end, the corresponding second driven mechanism 21 is connected via the second universal drive shaft 22 to a drive pulley 47. Drive pulley 4 drives the transmission 24 via a drive belt 48 and a driven pulley 49. The transmission 24 is connected to the main drive shaft 25 of the chopping device 4, which extends transversely to the direction of travel of the combine harvester (as described with reference to FIG. 1).

Figure 3:
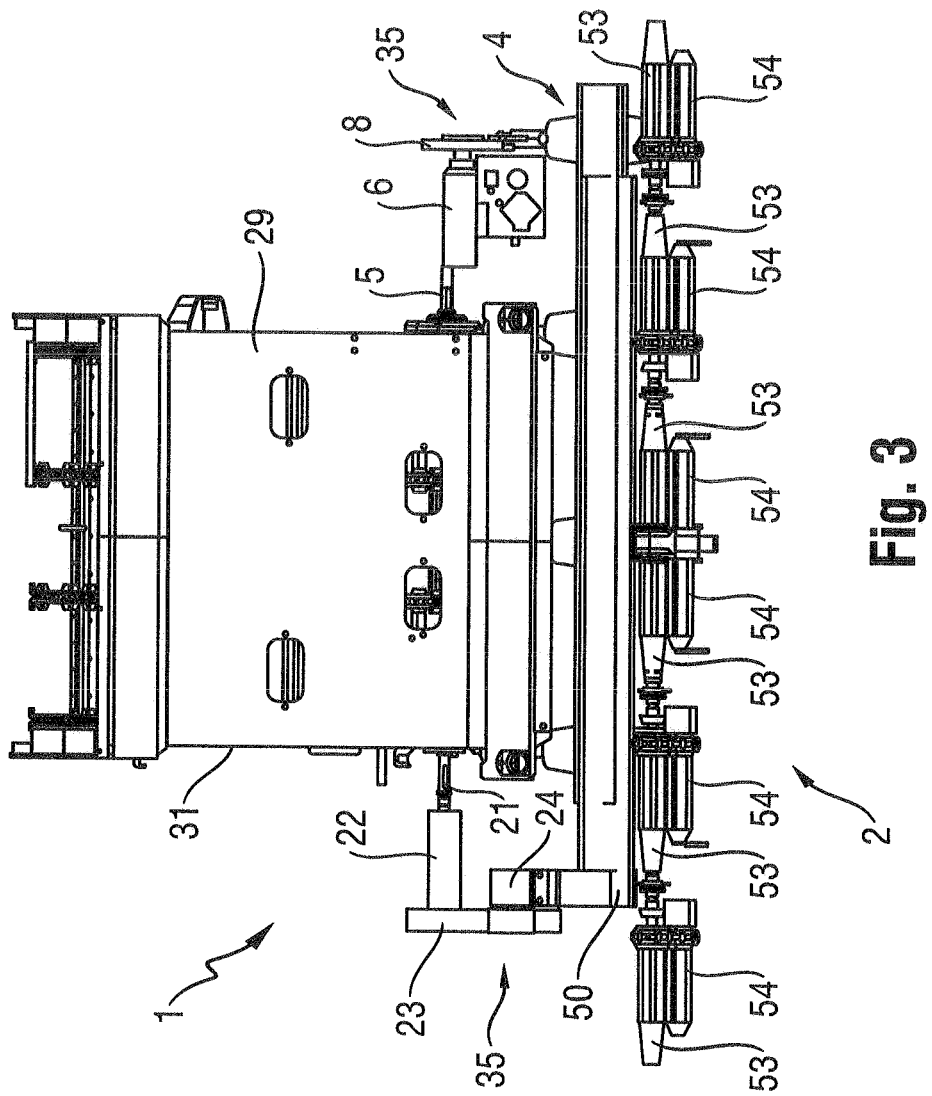
FIG. 3 presents a schematic representation, in a view from above, of a front attachment fastened on a feed rake.

FIG. 3 presents a schematic view from above of a front attachment 1 fastened to a feed rake 29. The FIG. 3 representation shows the first drive train 35 only in part and shows the second drive train 36 in its entirety. As explained above, the snapping device 2 and the cross conveyor 3 are both driven via the first drive train 35. The snapping device 2 comprises a snapping roller shaft and first snapping rollers 53 disposed thereon. These first snapping rollers 53 are connected in a driving manner via a gear pair 45 to second snapping rollers 54. These second snapping rollers 54 are equipped at the ends thereof with auger sections for drawing in corn stalks and the like.

The second drive train 36 can be retrofitted if necessary and is used exclusively to drive the chopping device 4. The chopping device 4 comprises a transmission housing 50. The transmission housing extends substantially across the width of the front attachment 1 and in which the main drive shaft 25 is disposed. The vertically extending knife shafts of the knives 20 extend into the interior of the transmission housing 50, in which the particular drives of the knives 20 also are disposed, in the embodiment shown, the particular drives are designed as bevel gears.

The transmission housing 50 forms a retrofittable assembly. The retrofittable assembly is installed onto or removed from the front attachment 1 in a relatively short period of time. The main transmission 24 is coupled to the main drive shaft 25 of the chopping device 4, in combination with the second driven mechanism 21, the clutch 21a, the second universal drive shaft 22 and the belt drive 23, forming a further retrofittable assembly. This construction markedly simplifies the procedure for retrofitting the front attachment 1, i.e., installing and deinstalling the chopping device 4 and the second drive train 36.

Figure 4:
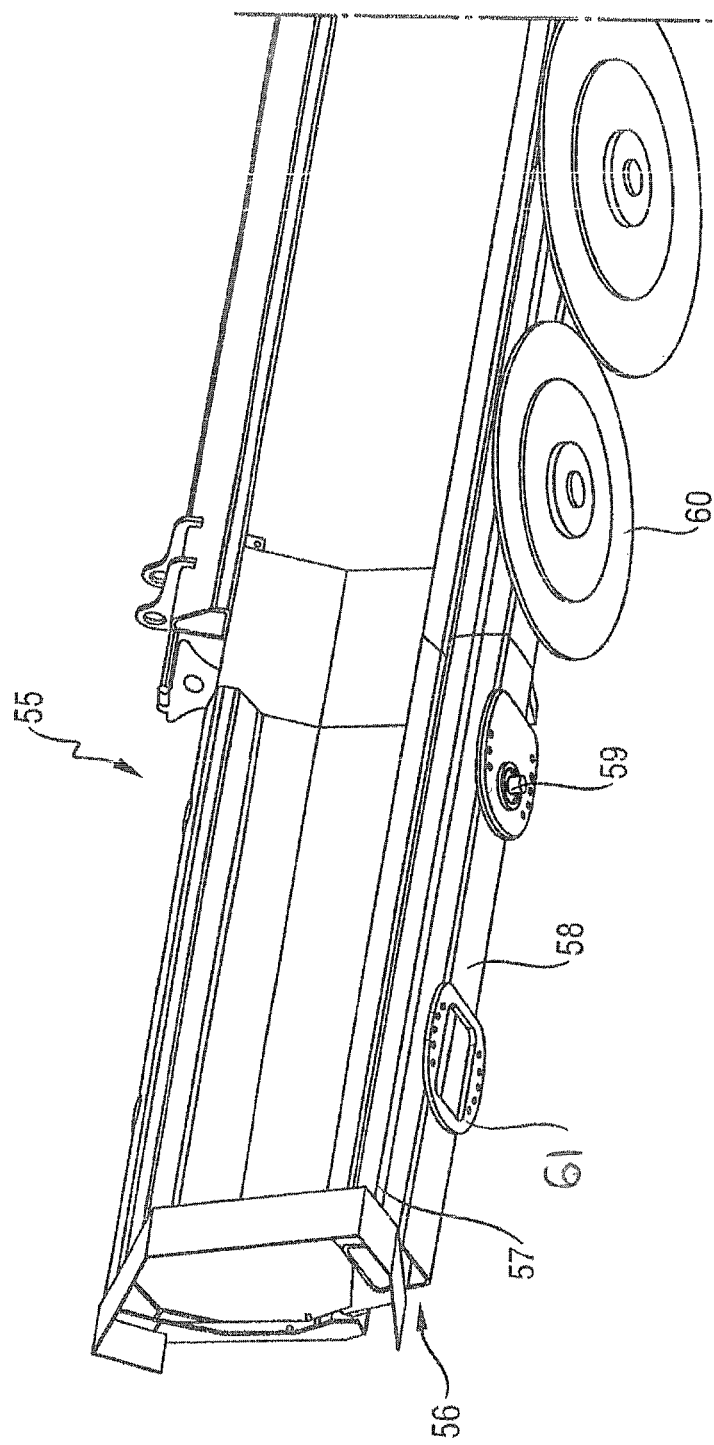
FIG. 4 presents a schematic partial view of a frame structure of a modular front attachment.

The transmission housing 50 is designed as a frame member 56 comprising at least two shells, i.e. a lower shell 58 and an upper shell 57 (as shown in FIG. 4). The upper shell 57 is preferably a component of a frame structure 55 of the front attachment 1 or alternatively, can be configured to be subsequently fastened to the frame structure 55. The lower shell 58, in combination with the bevel gears, the knife shafts 59 and the knife carriers 69, forms one unit that attaches at the upper shell 57. The particular bevel gear is connected to the lower shell 58 via a flange connection 61, thereby enabling the bevel gears to be replaced individually if necessary. The design of the part of the transmission housing 50 that carries the bevel gears has the advantage that components of the chopping device 4 are no longer installed individually. In addition, alignment errors of the shafts are reduced.

LIST OF REFERENCE SYMBOLS 1 front attachment
2 snapping device
3 cross conveyor
4 chopping device
5 first driven mechanism
6 first universal drive shaft
7 form-locking clutch
8 belt drive
9 hydraulic pump
10 primary disc
11 variator transmission
12 secondary disc
13 drive belt
14 output shaft
15 traction mechanism drive
16 belt drive
17 chain drive
18 overload clutch of 3
19 overload clutch of 2
20 knife of 4
21 second driven mechanism
21a form-locking clutch
22 second universal drive shaft
23 belt drive
24 transmission
25 main drive shafts of 4
26 overload clutches of 4
27 crop divider
28 intake conveyor mechanisms
29 conveyor discs
30 conveyor tines
31 conveyor channel
32 feed rake
33 feed rake shaft
33a main belt drive
34 feed rake housing
35 first drive train
36 second drive train 37 drive pinion of 7
38 chain
39 driven pinion of 7
40 shaft of 3
41 drive pulley of 16
42 drive belt of 16
43 driven pulley of 16
44 drive shaft of 2
45 gear pair
47 drive pulley
48 drive belt
49 driven pulley
50 transmission housing
51 auger section
52 snapping shaft of 2
53 first snapping rollers
54 second snapping rollers
55 frame structure
56 frame member
57 upper shell
58 lower shell
59 knife shaft
60 knife carrier
61 flange connection As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A front attachment (1) for an agricultural harvesting machine that operates independently of rows of stalk crop to be harvested, comprising:
   harvesting devices for harvesting the stalk crop;
   intake conveyor mechanisms (28) extending across a width of the harvesting devices;
   snapping devices (2) located downstream of the intake conveyor mechanisms (28) in the direction of the crop flow; and
   at least one cross conveyor (3) located downstream of the intake conveyor mechanisms (28) and snapping devices (2),
   wherein the cross conveyor and snapping device driven by a common drive train (35),
   wherein the front attachment (1) is configured for retrofitting with a second drive train (36), and
   wherein the second drive train functions as the drive for a retrofittable chopping device (4).

2. The front attachment (1) according to claim 1, wherein the second drive train (36) and the chopping device (4) driven thereby are retrofitted as separate modules.

3. The front attachment (1) according to claim 1, wherein the first drive train (35) and the second drive train (36) comprise means for varying the speed that is output to the driven harvesting devices.

4. The front attachment (1) according to claim 3, wherein the means for varying the speed adjusts the speed stepped or steplessly.

5. The front attachment (1) according to claim 1, wherein the chopping device (4) shifts independently of the intake conveyor mechanism (28), the snapping devices (2) and the cross conveyor (3).

6. The front attachment (1) according to claim 5, wherein the second drive train (36) shifts to engage and disengage a universal drive shaft (22) in a tool-free manner.

7. The front attachment (1) according to claim 6, wherein the second drive train (36) is shifted by a central clutch (21a).

8. The front attachment (1) according to claim 7, wherein the central clutch (21a) is a friction clutch.

9. The front attachment (1) according to claim 5, wherein the chopping device shifts automatically.

10. The front attachment (1) according to claim 1, wherein a central free wheel mechanism is provided in the second drive train (36).

11. The front attachment (1) according to claim 1, wherein the chopping device (4) comprises a transmission housing (50), wherein the transmission housing extends substantially across the width of the front attachment (1), wherein vertically extending knife shafts extend into the transmission housing in sections and wherein bevel gears driving the knife shafts are disposed in the transmission housing.

12. The front attachment (1) according to claim 11, wherein a main transmission (24) that is a component of the second drive train (36) is disposed at the transmission housing (50).

13. The front attachment according to claim 11, wherein the transmission housing (50) is a frame member comprising at least one upper shell (57) and one lower shell (58), which has flange connections (59).

14. The front attachment (1) according to claim 11, wherein the upper shell (57) is a component of a frame structure (55) of the front attachment (1).

15. The front attachment (1) according to claim 11, wherein the upper shell (57) is subsequently fastened to the frame structure (55) of the front attachment (1).

* * * * *